Figure 3:
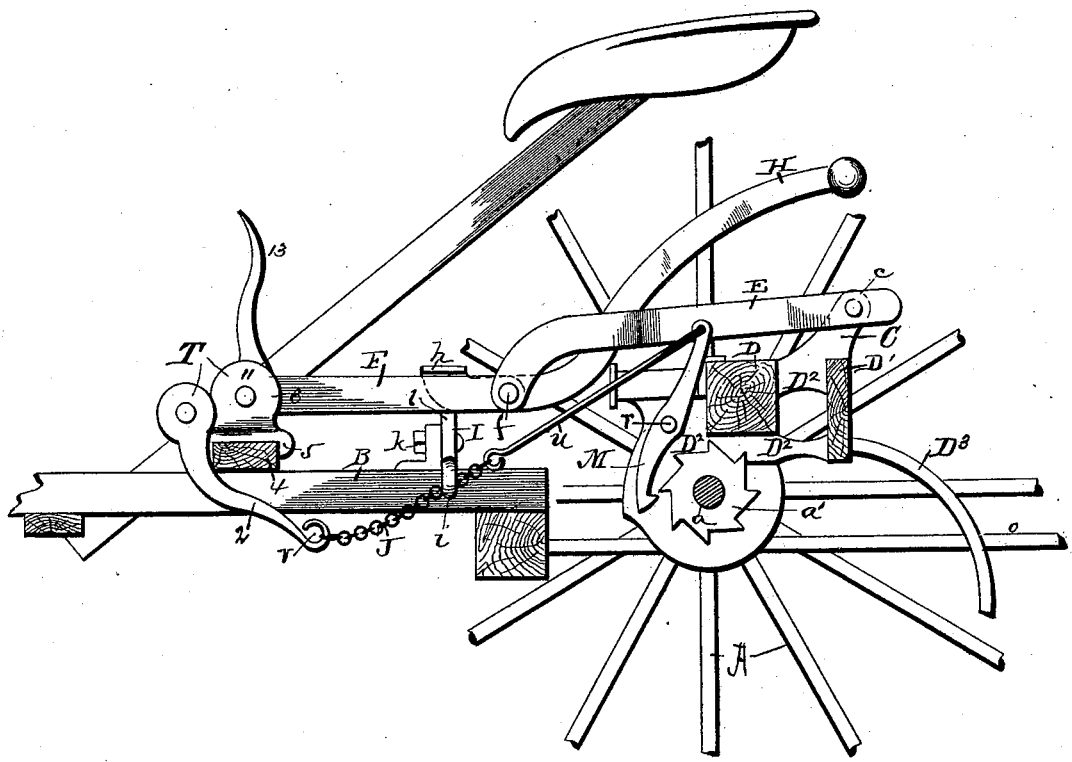

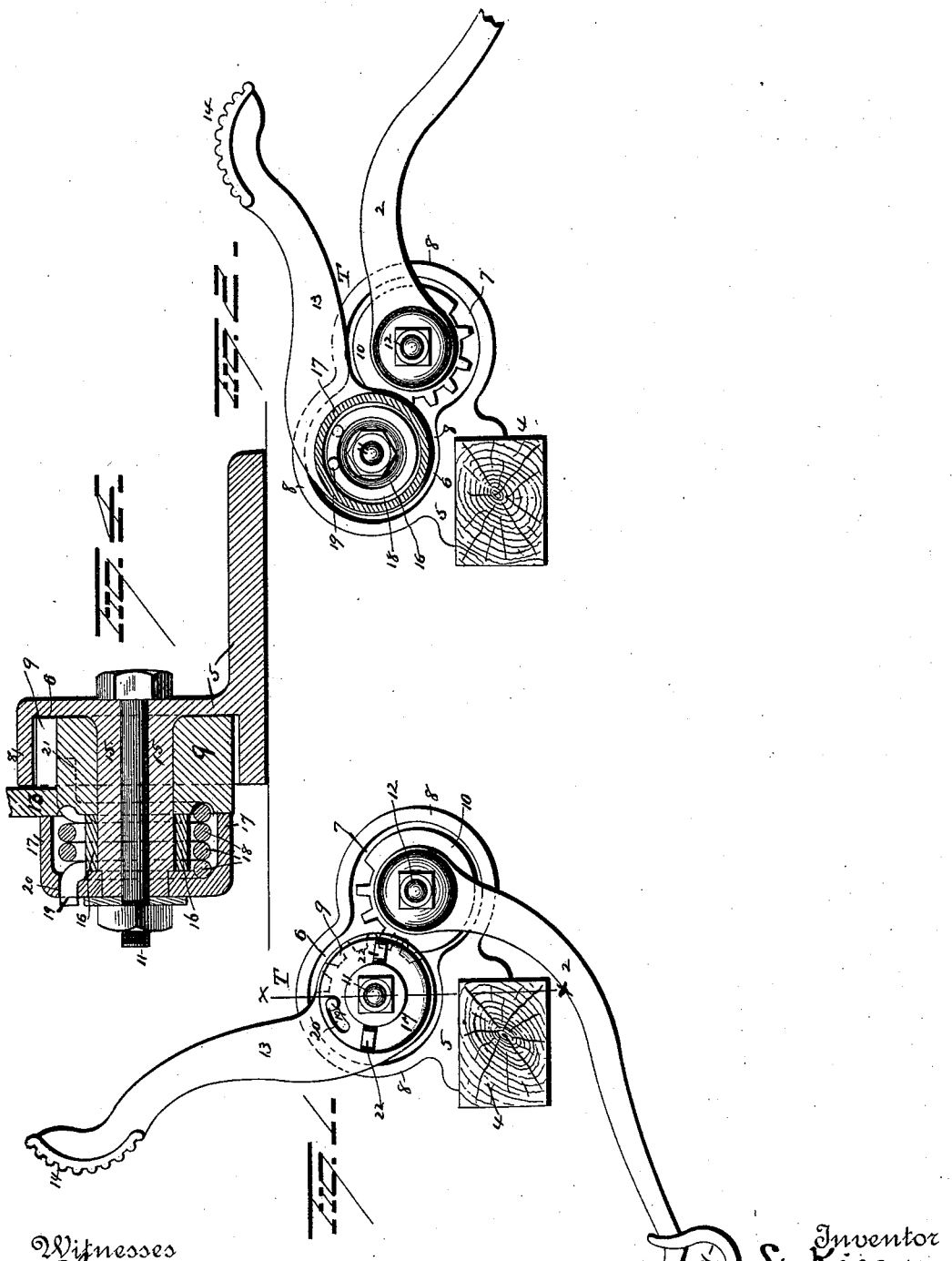

(No Model.) 2 Sheets—Sheet 2.

L. KISSNER.
HORSE HAY RAKE.

No. 404,846. Patented June 11, 1889.

UNITED STATES PATENT OFFICE.

LEONARD KISSNER, OF LANCASTER, OHIO, ASSIGNOR TO THE HOCKING VALLEY MANUFACTURING COMPANY, OF SAME PLACE.

HORSE HAY-RAKE.

SPECIFICATION forming part of Letters Patent No. 404,846, dated June 11, 1889.

Application filed July 7, 1888. Serial No. 279,318. (No model.)

*To all whom it may concern:*

Be it known that I, LEONARD KISSNER, a resident of Lancaster, in the county of Fairfield and State of Ohio, have invented certain new and useful Improvements in Foot-Treadles for Horse Hay-Rakes; and I do hereby declare the following to be a full, clear, and exact description of the invention, such as will enable others skilled in the art to which it appertains to make and use the same.

My invention relates to an improvement in mechanism adapted to coact with and throw into action the dumping mechanism of a horse hay-rake for which Letters Patent No. 369,604 were issued to Leonard Kissner and John J. Groome, September 6, 1887.

The object of my present invention is to provide a simple and effective mechanism to be operated by the foot of the driver to throw into action the dumping mechanism, whereby the dumping of the load gathered by the rake-teeth will be greatly facilitated and the operation of the rake rendered more perfect.

A further object is to so construct such a mechanism for horse hay-rakes that it may be operated by being pressed forward instead of backward by the driver to throw the dumping mechanism into action to cause the rake to dump its load.

With these objects in view my invention consists in certain features of construction and combinations of parts which will be hereinafter set forth, and pointed out in the claims.

Referring to the drawings, making a part of the specification annexed, Figure 1 is a side elevation, in perspective, of my invention, with the parts in normal position on the supporting-bar, which is shown in cross-section. Fig. 2 is a side elevation, partly in section, of the same, with the parts shown in the position they assume when pressure is applied to the treadle. Fig. 3 is a side elevation of the same in connection with the dumping mechanism of the rake, the frame and axle of the rake being shown as they appear in sectional elevation taken on a line from front to rear of the horse hay-rake and through the center of length of the axle. Fig. 4 is a section on dotted line $x\ x$ of Fig. 1.

Referring to Fig. 3 of the drawings, the running-gear of the rake consists of a round axle $a$, on which is secured the wheels at its ends. On the axle is loosely mounted the rake-head, which consists of two pieces D D', held apart upon spacing-brackets $D^2$, which latter also afford rocking bearings for the rake-head.

It will be seen that the beams D D' of the rake-head are supported by the brackets $D^2$. Their weight will thus be projected beyond the axle on the rear side of the machine, so that it, together with the added weight of the teeth $D^3$, will assure the engagement of the points of the latter with the cut hay by the action of gravity, the teeth being shown in such position in Fig. 3.

Upon the axle $a$, at about its middle of length between the wheels A, a ratchet-wheel $a'$ is secured, the teeth of which are cut to permit a locking engagement of the swinging-dog M, which is pivoted at $r$ to the bracket $D^2$, the upper end of said dog having a connection with the lower lever 2 of the treadle mechanism T, as will be more fully explained.

The bracket-limb C is a lateral rearward extension from the rake-head beams D D', and assists to space and hold said beams apart and parallel to each other.

Upon a cross-bar 4 of the shafts, near the driver's seat, a bracket 5 is secured, having two circular recesses 6 7 made in its upright portions, thus leaving the shell-like walls 8 standing. The recesses 6 7 are intended to receive two partially-toothed pinions 9 10, the dividing wall of the recesses being removed to permit the pinions to mesh with each other.

A connecting bar or link E loosely connects the upper end $c$ of the rake-head-operating arm C with the forward pivoted arm F, the front or lower end of which is pivotally attached to the bracket 5. The connecting-bar E is bifurcated preferably at both ends, the rake-head arm C being pivoted between the parts of the rear bifurcated end, and the pivoted arm F between the gradually downwardly bending forward bifurcated end. A handle H about the length of the bar E is also pivoted at its forward end between the forks of the forward end of link E, and is provided with a nose $h$, which acts as a fulcrum when the handle is operated. The nose $h$ is formed on the extreme forward end of handle H forward of the pivot $f$, which nose clasps over the pivoted arm F when the latter is depressed and the rake is lowered. When in this adjustment, the rake-teeth are securely locked down in contact with the ground, so that any amount of jolting of the rake over stones and dead furrows will not unlock it. A transverse lever I, with an eye $i$ in the end of its long arm, is pivoted on the lug $k$, which lug is located on a block B forward of the rocking rake-head, the short arm $l$ of lever I resting normally beneath the arm F when the latter is depressed. A chain J, or similar connection, passes through the eye $i$, one end being secured to the depending arm 2 and the other end to one end of the dog M, or to a rod $u$, connected to said dog.

Both cups or circular recesses 6 7 of bracket 5 are centrally perforated to receive the bolts 11 12, which are provided to hold in place the toothed segmental pinions 9 10, and the attached lower lever 2 and upwardly-projected treadle-lever 13.

The lever 2 is secured to the side of the toothed disk or segmental pinion 10, and is downwardly extended a proper length, having an eye $v$ formed in its free end, to which the chain J is secured.

The upwardly-extended treadle-lever 13 is preferably made integral with the segmental pinion 9, and is provided with a serrated foot-piece 14, which is the terminal of the upper end of the lever. The integral pinion 9 is centrally perforated to engage loosely the stud 15, which is preferably made integral with the bracket 5 at a proper point to accommodate the pinion end of the lever 13, as stated.

Upon the portion of the stud 15 which projects through and beyond the bracket 5, a loose collar or sleeve 16 is placed, said sleeve extending to the end of the cylindrical portion of stud 15. From the outer edge of the sleeve 16 the stud 15 is projected, and given a hexagonal form to adapt it to receive and retain the spring-box 17, in which a spiral spring 18 is contained, said spring lying between the outer cylindrical surface of the sleeve 16 and the inner surface of the cup-shaped spring-box.

A hexagonal perforation is made in the center of the spring-box wall of a size corresponding to the hexagonal projection formed on the extremity of the stud 15, and the center bolt 11 is of a proper length to extend beyond this side wall of the spring-box 17 to receive a retaining-nut, which, when adjusted properly, holds all the parts together.

The outer end 19 of the spirally-coiled spring 18 is bent into hook form to be inserted and lock into a slot 20 made for it in the wall of the spring-box at a proper point, and the other end of the spring is similarly engaged with the segmental pinion 9 of the treadle-lever 13, it being inserted in a perforation 21 made therein.

Projections or thumb-pieces 22 are formed on the side of the spring-box 17 to permit it to be rotated, and thereby adjust the tension of the spiral spring 18, which when effected, is secured by engagement of the box with the stud 15 and the clamping action of the bolt 11 and its nut, as before explained.

If the treadle-lever 13 is pressed against to push it from a vertical toward a horizontal position, the lower lever 2 will, by reason of its geared connection therewith, be caused to vibrate in the same direction as the treadle-lever, so that the points of the two levers 2 and 13 will approach each other, and when pressure is relaxed the lever 13 will be restored to a vertical position by the energy of the coiled spring 18, and thus disengage the pawl M from ratchet $a'$.

It is apparent that when the mechanism T is mounted and connected to the chain J, as previously stated, an outward pressure of the foot of the driver upon the treadle-lever 13 will cause a corresponding movement in the same direction of the lower lever 2, which will vibrate the dog M and dump the loaded fork in an obvious manner.

It will also be seen that when the treadle-lever 13 is pressed forward to cause the dog M to engage the toothed wheel $a'$ the long arm of the transverse lever I will be depressed. Its opposite end, rising and coming in contact with the arm F, unlocks or releases the arm, link, and handle.

Slight changes might be made in the details of construction of the mechanism herein described without a departure from the spirit of my invention. Hence I do not desire to limit my claims to the exact forms herein shown; but, Having fully described my invention, what I claim as new, and desire to secure by Letters Patent, is—

1. In a horse hay-rake, the combination of a rake-head, automatic dumping mechanism, a bracket mounted on the frame, two levers pivoted thereon in the same vertical plane, intermeshing gears carried by the levers to cause them to vibrate in the same direction when pressure is applied to one of said levers, and connections between the other lever and dumping mechanism, substantially as set forth.

2. In a horse hay-rake, the combination of a rake-head, an automatic dumping mechanism, a bracket mounted on the frame, an upstanding treadle-lever and a depending lever, both pivoted on the bracket in the same vertical plane and provided with intermeshing teeth, a spring engaging one of said levers to restore them to their normal position, and connections between one of said levers and the dumping mechanism.

3. In a horse hay-rake, the combination of a rake-head, dumping mechanism, a bracket mounted on the frame and provided with recesses, intermeshing pinions mounted in said recesses and provided with projecting levers, connections between one of said levers and the dumping mechanism, and a spring engaging one of said levers for holding both levers in their normal positions, substantially as set forth.

4. The combination, in a horse hay-rake, of the axle, two draft-wheels affixed thereto, a ratchet-wheel secured on the axle, a rake-head pivoted on the axle, and a dog pivoted on the rake-head and adapted to interlock with the teeth of the ratchet-wheel, of a depending lever pivoted on the frame and connected to the pivoted dog, an upwardly-projecting treadle-lever, also pivoted on the frame and geared to the first-named lever, and a spring engaged with the treadle-lever to restore it to its normal position, substantially as set forth.

In testimony whereof I have signed this specification in the presence of two subscribing witnesses.

LEONARD KISSNER.

Witnesses:
ALBERT L. HEISTER,
LEB WAGNER,
WILLIAM DAVIDSON.